Patented July 18, 1939

2,166,183

UNITED STATES PATENT OFFICE 2,166,183

HYDROGENATION OF ALIPHATIC DINITRILES

Frank K. Signaigo, Wilmington, Del., assignor to E. I. du Pont de Nemours & Company, Wilmington, Del., a corporation of Delaware No Drawing. Application September 24, 1938, Serial No. 231,505

24 Claims. (Cl. 260—583)

This invention relates to catalytic hydrogenation processes and more particularly to the hydrogenation of cyanoalkanes using certain cobalt catalysts and still more particularly to the hydrogenation of dicyanoalkanes by means of highly selectively primary amine-forming cobalt hydrogenation catalysts.

In the copending applications of Benjamin W. Howk, Serial No. 49,973, filed November 15, 1935, and Serial No. 127,203, filed February 23, 1937, there are disclosed processes for the catalytic hydrogenation of certain dinitriles to the corresponding diamines, using principally nickel as a hydrogenation catalyst. Prior to the discoveries claimed in the aforementioned applications, diamines in general were prepared by laborious and inefficient methods among which may be mentioned the sodium reduction of dinitriles, the hypochlorite degradation of diamides, the reaction of dihalides with ammonia, etc. Most of these methods involve the use of aqueous solutions, salts, etc., from which it is extremely difficult to isolate the diamines in pure form. The processes claimed in the aforementioned applications were the first practical methods of converting aliphatic dinitriles, and especially adiponitrile, to the corresponding diamines. These processes, however, are open to certain objections even though in the case of adiponitrile conversions to hexamethylene diamine of 90 to 91% are obtained. Among these objections may be mentioned the fact that (1) along with the desired primary amine there are obtained 9 to 10% of hexamethylene imine and polymeric secondary amines whose presence raises purification problems and increases costs, (2) the fact that in the case of nickel, the use of ammonia and a liquid phase reaction is necessary for the successful hydrogenation of the preferred dinitrile, adiponitrile, to the corresponding diamine.

This invention has as its object the preparation of diaminoalkanes. A further object is the preparation of primary diaminoalkanes by catalytic hydrogenation of dicyanoalkanes. A still further object is to prepare primary diaminoalkanes in high yields by catalytic hydrogenation of dicyanoalkanes and in such manner as to avoid to a large extent the formation of secondary and tertiary amines. Another object is the preparation of hexamethylene diamine by the catlytic hydrogenation of 1,4-dicyanobutane. Other objects will be apparent upon the reading of the following description of the invention.

These objects are accomplished by the following invention which comprises reacting a cyanoalkane containing from 3 to 20 carbon atoms (in the presence or absence of ammonia) with hydrogen in the presence of a cobalt hydrogenation catalyst characterized by being "highly selectively primary amine-forming", which term is used to refer to those cobalt catalysts which are pyrophoric or those which have been stabilized by exposing a pyrophoric cobalt catalyst to an oxidizing atmosphere while maintaining the catalyst mass at a temperature below 50° C. Typical methods for the preparation of such catalysts are disclosed in connection with the examples.

Since the exact manner of practicing this invention will vary somewhat in the conditions employed depending upon the particular dicyanoalkane processed, the invention is best described by means of the following specific examples of its practice.

Example I

A highly selectively primary amine-forming catalyst is prepared as follows: 50 g. of finely powdered alloy composed of equal weights of cobalt and aluminum is suspended by stirring in 300 cc. of boiling water. To this is added slowly a solution of 50 g. of sodium hydroxide in 100 cc. of water and the mixture boiled for 4 hours. The supernatant liquid is then replaced with a fresh solution of 50 g. of sodium hydroxide in 300 cc. of water and the mixture boiled for an additional 4 hours. The finely divided cobalt so formed is washed with water by decantation until free from alkali and is then stored under ethanol until used. The finely divided metal is very pyrophoric and must not be exposed to air unless it be stabilized by a procedure similar to that described in Example IV. Cobalt, so prepared is very effective in catalyzing the hydrogenation of dicyanoalkanes to diaminoalkanes as is illustrated by the following experiment.

One hundred g. of 1,4-dicyanobutane, 75 g. of anhydrous ammonia and 8 g. of the cobalt catalyst (as ethanol paste), the preparation of which is described above, are sealed in a small shaking autoclave. Hydrogen is forced into the autoclave until the total pressure is 2,000 lbs./sq. in, and the autoclave and contents are heated, electrically to a temperature of 120° C. At this temperature, reaction is rapid and additional hydrogen is introduced into the autoclave to replace that used up so as to keep the total pressure between 1,000 and 3,000 lbs./sq. in. After 40 minutes no more hydrogen is absorbed and the reaction is complete. After cooling the autoclave, the product is rinsed out with methanol, separated from the catalyst by filtration and distilled at reduced pressure. There is obtained 104 g. of pure 1,6-diaminohexane, boiling-point 90–92° C. at 14 mm. pressure, melting point 41° C. This is equivalent to 97% of the theoretical yield. Only small quantities of higher boiling polyamino compounds and hexamethylene imine (boiling point 136–138° C.) are obtained as by-products of the reaction.

*Example II*

One hundred g. of 1,2-dicyanoethane (succinonitrile), 75 g. of anhydrous ammonia and 10–15 g. of finely divided cobalt catalyst prepared as described in the first paragraph under Example I are heated under a total pressure of 1,200–3,000 lbs./sq. in. with hydrogen in an autoclave. At a temperature of 120° C. the reaction is complete in 3 hours. On distilling the product there is obtained 1,4-diaminobutane, boiling point 158° C. in 36% yield. If, by way of contrast a nickel catalyst, prepared in a manner similar to that used for the preparation of the cobalt catalyst, is used for this reaction, the yield of 1,4-diaminobutane obtained is only 15%.

*Example III*

Another type of highly selectively primary amine-forming cobalt catalyst is prepared as follows: Anhydrous cobalt chloride is suspended with stirring in a solution of naphthalene in dimethyl glycol ether. Sodium is added to the reaction mixture and dissolves to form a solution of sodium naphthalene which compound immediately reacts with the suspended cobalt chloride to form finely divided metallic cobalt and sodium chloride. After the equivalent quantity of sodium has reacted, the mixture is filtered and the solid portion washed free from naphthalene with fresh dimethyl glycol ether solvent; the sodium chloride is then separated from the cobalt by washing with water. The elementary cobalt exists in a fine state of subdivision, is pyrophoric and is active in promoting the hydrogenation of dicyanoalkanes selectively to diaminoalkanes as is illustrated by the following experiment:

One hundred g. of 1,4-dicyanobutane (adipic acid dinitrile), 75 g. of ammonia, 8 g. of the cobalt catalyst, prepared by the foregoing procedure, are charged into a small autoclave. Hydrogen is forced into the autoclave to a total pressure of 2,500 lbs./sq. in. and the temperature raised to 120° C. Hydrogen is rapidly absorbed and the pressure is maintained between 1,000 and 3,000 lbs./sq. in. by the addition of more hydrogen as needed. Reaction is complete in 0.5 hour. Thereafter the autoclave is cooled, the product dissolved in methanol, filtered from the catalyst and vacuum distilled. There is obtained 103.8 g. of 1,6-diaminohexane or 96.9% of the theoretically possible yield.

*Example IV*

A highly selectively primary amine-forming supported cobalt catalyst is prepared as follows: 100 g. of finely ground cobalt-aluminum alloy containing equal parts by weight of cobalt and aluminum is suspended with stirring in 250 cc. boiling water. A solution of 60 g. of sodium hydroxide in 175 cc. water is added during 2 hours. Thereafter the mixture is boiled for 4 hours. The resultant finely divided product is washed with water by decantation until free from alkali. The product when exposed to air in the dry state will become hot due to oxidation of the metallic cobalt therein with resultant impairment of its catalytic activity. It may, however, be stabilized so that it can be handled in the dry state and with free exposure to air by the following procedure. The aqueous sludge of the product is placed in a rotating vessel. The vessel is sealed and the air exhausted by means of a vacuum pump and the mass heated under vacuum until all of the free water is removed. The vessel is then cooled continuously with cold water and a small stream of air is blown through the dry gray powder at such a rate that the temperature of the mass does not exceed 30° C. After 2 hours treatment, a sample of the powder is found to no longer become hot when freely exposed to air and the stabilization process is then complete. The catalyst is found by analysis to consist of 37.3% cobalt of which 55% is in the elementary state, and 43% of $Al_2O_3$. The catalyst therefore probably consists of partially oxidized cobalt supported on hydrated alumina. The catalyst is selective in catalyzing the hydrogenation of dicyanoalkanes to diaminoalkanes as is illustrated by the following example.

A small high pressure shaking autoclave is charged with 100 g. 1,4-dicyanobutane, 75 g. of anhydrous ammonia and 15 g. of the above described cobalt-on-alumina catalyst. Hydrogen under pressure is admitted to the autoclave and the mixture heated to 120° C. Hydrogen is rapidly absorbed over a period of 0.5 hour, the total pressure being maintained in the range from 1,500 to 2,000 lbs./sq. in. by the addition of more hydrogen as needed from high pressure storage tanks. The autoclave is cooled, the products taken up in warm methanol, and the mixture filtered to remove the catalyst. Fractional distillation of the product shows the conversion to 1,6-diaminohexane to be 97.2%.

The above experiment is repeated under exactly the same conditions except that no ammonia is added. On working up the reaction mixture there is obtained 93.1 g. of 1,6-diaminohexane corresponding to an 87% yield. This shows, strikingly, the primary amine-forming nature of the catalyst since even without the addition of ammonia, the diaminoalkane is formed in high yield.

*Example V*

Two thousand g. of 1,8-dicyanooctane, 1,500 g. of ammonia and 250 g. of primary amine-forming cobalt catalyst prepared as described in Example IV are charged into an autoclave and reacted with hydrogen substantially as described in Example IV. The solid product obtained is dissolved in methanol, filtered from the catalyst and purified by vacuum distillation. There is obtained 2,030 g. of pure 1,10-diaminodecane boiling point 140° C. at 12 mm. which corresponds to a yield of 96.8% of the theoretical.

The above experiment is repeated except that 1,7-dicyanoheptane is substituted for the cyanoalkane used above. In this case there is obtained on working up the reaction mixture, 1,9-diaminononane in 87% yield.

*Example VI*

One hundred g. of 1,4-dicyano-2-tertiary butyl-butane, 75 g. of ammonia and 15 g. of the cobalt catalyst described under Example IV are reacted with hydrogen under pressure at a temperature of 120° C. On working up the reaction mixture there is obtained 1,6-diamino-3-tertiary butylhexane in 86% yield.

If by way of contrast a nickel catalyst is used instead of the cobalt catalyst described, the yield of 1,6-diamino-3-tertiary butylhexane obtained is only 60% of the theoretical.

*Example VII*

Another type of highly selectively primary amine-forming cobalt catalyst is prepared by the following procedure: A solution of 124 g. of sodium bicarbonate in 2.5 liters of water is added to a suspension of 47 g. of natural, untreated kieselguhr in a solution of 150 g. of cobalt nitrate in 0.31 liters of water. Cobalt carbonate is precipitated on the surface of the kieselguhr. This mixture is then digested at 80° C. for 2 hours. The product is filtered, washed and dried and the cobalt carbonate is reduced to elementary cobalt by heating in a stream of hydrogen at 475° C. over a period of 2 to 3 hours, particular care being taken to prevent the access of even traces of air or oxygen to the catalyst during or after the reduction process and while the catalyst is at a temperature above 50° C. The resulting catalyst powder is very effective in promoting the hydrogenation of dicyanoalkanes to diaminoalkanes. For example 1,6-dicyanohexane is converted to 1,8-diaminooctane in 97.2% yield under conditions similar to those described in the foregoing examples.

*Example VIII*

Sixty-eight g. of 1,5-dicyanopentane, 50 g. of anhydrous ammonia and 6 g. of the highly selectively primary amine-forming catalyst described in Example IV are treated with hydrogen at 1,500 lbs./sq. in. pressure and 120° C. in a high pressure autoclave. Reaction is complete in 1 hour and on distillation, the product is found to consist of 59 g. of 1,7-diaminoheptane, boiling point 100–101° C. at 11 mm. together with only traces of heptamethylene imine and high boiling polymeric residues.

The above experiment is repeated except that 2,5-dicyanohexane is substituted for the cyano compound used above. There is obtained from the reaction mixture, 1,6-diamino-2,5-dimethylhexane in 88% yield.

*Example IX*

Twenty-five g. 1,4-dicyanobutane, 19 g. ammonia and 4 g. of cobalt catalyst prepared as described under Example IV are charged into a small shaking autoclave. Hydrogen is then forced into the autoclave to a total pressure of 10,000 lbs./sq. in. The temperature is then raised to 120° C. and hydrogen is rapidly absorbed. Additional hydrogen is added to maintain the total pressure above 10,000 lbs./sq. in. Reaction is complete in 15 minutes. On working up the reaction mixture there is obtained 1,6-diaminohexane in 93% yield. When the reaction is carried out under identical conditions except that a nickel catalyst is used, the yield of 1,6-diaminohexane obtained is only 77%.

While in the examples purified dicyanoalkanes have been used this is not necessary since in the practice of this invention crude dicyanoalkanes and dicyanoalkanes containing some amounts of water may also be used. For example the product obtained by the catalytic vapor phase dehydration of a mixture of ammonia and adipic acid at elevated temperatures will, after separation of the water layer, give a crude 1,4-dicyanoalkane containing approximately 80% 1,4-dicyanobutane saturated with water together with other impurities. This material may be successfully hydrogenated to the corresponding diaminoalkane, as shown by the following example.

*Example X*

One hundred grams of the crude 1,4-dicyanobutane, prepared as described above, 75 g. of ammonia and 15 g. of cobalt catalyst, prepared as described in Example IV, are charged into a small autoclave together with hydrogen at superatmospheric pressure and heated to 120° C. After 1.5 hours the absorption of hydrogen ceases and the reaction products are distilled at reduced pressure. There is obtained 82 g. of pure 1,6-diaminohexane corresponding to a yield of 96% of the theoretical.

The above experiment is repeated under exactly the same conditions except that the crude 1,4-dicyanobutane is substituted by pure 1,4-dicyanobutane saturated with 7 to 8% water at room temperature. On working up the reaction product there is obtained 95.5 g. of pure 1,6-diaminohexane corresponding to a yield of 96 to 97%.

In the foregoing examples there has been indicated specifically certain dicyanoalkanes which may be converted into the corresponding diaminoalkanes according to this invention. The invention, however, is not limited to these particular materials. The catalytic hydrogenation of any and all dicyanoalkanes containing at least 3 and not more than 20 carbon atoms, to the corresponding diaminoalkanes by means of highly selectively primary amine-forming cobalt catalysts is considered to fall within the scope of this invention. It is likewise to be understood that the processes of this invention apply to dicyanoalkanes containing a single straight chain of carbon atoms or a branched carbon atom chain and that the cyano group may be located at the end or removed from the end of the carbon atom chain. In addition to the materials illustrated in the foregoing examples, dicyanoalkanes such as 1,10-dicyanodecane, 1,12-dicyanododecane, 1,14-dicyanotetradecane, 1,16-dicyanohexadecane and 1,18-dicyanooctadecane may be mentioned as materials that can be converted into diaminoalkanes according to this invention. Dicyanoalkanes which contain more than 20 carbon atoms are not included, since these materials are ordinarily not readily obtainable.

It is furthermore considered that the conversion of aminocyanoalkanes to diaminoalkanes by catalytic hydrogenation using highly selectively primary amine-forming cobalt catalysts likewise constitutes a part of this invention. As examples, may be mentioned the conversion of 1-cyano-5-aminopentane and 1-cyano-9-aminononane to 1,6-diaminohexane and 1,10-diaminodecane, respectively. Still further the conversion of cyano-oxo-alkanes in the presence of ammonia to diaminoalkanes by the use of highly selectively primary amine-forming cobalt catalyst likewise falls within the scope of this invention. For example, 1-cyano-11-oxo-heptadecane may be converted to 1,12-diaminooctadecane by this invention.

Although in the above examples there has been indicated certain definite conditions of temperature, pressure, concentration, duration of reaction, catalyst, etc., it is to be understood that these values may be varied somewhat within the scope of this invention since the conditions of each experiment are determined by the particular dicyanoalkane treated, the quantity used and the catalyst employed. In general the processes of this invention are operable at temperatures ranging from 50 to 170° C. and at pressures ranging from atmospheric to a maximum determined by the partical limitations of the reaction vessel. It is advisable, however, to maintain a pressure higher and a temperature lower than the corresponding critical values for ammonia if this ingredient be used in order that it be preserved in the liquid state. It is preferred to operate at a temperature of 75 to 140° C. and under a total pressure of 1,000 to 10,000 lbs./sq. in.

The proportion of ammonia used may be varied considerably and will depend upon the particular dicyanoalkane processed. In general the amount of ammonia used will be from 10 to 100 parts by weight per 100 parts of dicyanoalkane.

The proportion of cobalt catalyst employed wholly or in part in the reduced state and further beneficial reduction may occur during the hydrogenation process.

The process may be carried out in the presence of water or an inert organic solvent such as alcohol, ether or a hydrocarbon solvent. As examples of specific organic solvents one may use either methanol, dioxan or toluene. It is preferred however to carry out the reaction in the absence of solvents other than ammonia unless the dicyanoalkane is a solid of melting point higher than the desired reaction temperature.

The formation of primary amines by reduction of nitriles is usually accompanied by the simultaneous formation of secondary and tertiary amines to a considerable extent. The formation of these by-products is perhaps best explained by the following mechanism which has been accepted for several years.

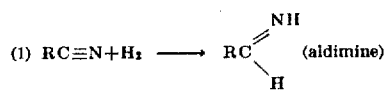

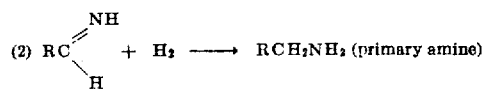

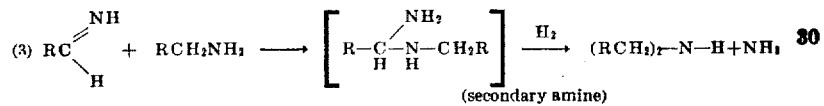

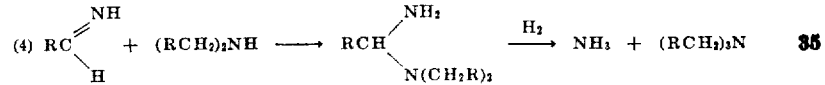

In the case of dicyanoalkanes containing 4, 5 and 6 carbon atoms there is also:

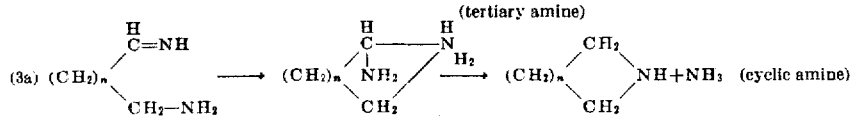

may be varied considerably. The type of cobalt catalyst employed may likewise be varied and still come within the scope of this invention so long as the catalysts are prepared according to the general methods that have found to yield highly selectively primary amine-forming catalysts. The performance of the catalysts best characterizes them but certain generalities may be observed. (1) The catalysts contain as their active constituent finely divided metallic cobalt. (2) They are of either of two classes: (a) Pyrophoric cobalt catalysts prepared by a method such that the active form of the metal is produced at temperatures below 150° C. or pyrophoric cobalt catalysts supported on an inert carrier prepared by reducing a cobalt compound such as cobalt oxide, carbonate, etc. with hydrogen at relatively high temperatures (400–700° C.), the catalyst not being exposed to an oxidizing atmosphere prior to use; (b) Stabilized cobalt catalysts prepared by exposure of pyrophoric cobalt catalysts prepared as described above to an oxidizing atmosphere while maintaining the catalyst mass at a temperature below 50° C.

If a supporting material is used it may be a form of silica such as kieselguhr or it may be magnesia or alumina and may be added during the catalyst preparation as such (Example VII) or formed during the catalyst preparation as in Example IV. The catalysts may exist either It has been found that with the cobalt catalysts described above the formation of secondary (and cyclic) and tertiary amines occurs to an almost negligible extent if ammonia is present as compared with the behavior of other types of hydrogenation catalysts and that even in the absence of ammonia the formation of primary amine preponderates. This specific selectivity of these certain cobalt catalysts has been hitherto unknown but it appears that this behavior is due to either or both of two properties of these catalysts. (1) The cobalt catalysts mentioned may have the special absorptive property of retaining the intermediate hydrogenation product (the aldimine) firmly absorbed on the catalyst surface so that it is never set free to react with already formed primary amine but is itself converted to primary amine without ever leaving the catalyst surface. Or (2) these catalysts lack the property (which other types of catalyst may possess) of catalyzing the reaction between the aldimine and the primary amine (reactions 3 and 3a above).

This invention is used for the preparation of diaminoalkanes which are valuable products having many industrial uses either as such or as intermediates in the manufacture of other important products.

This invention offers many advantages over the prior art from the standpoint of economy and efficiency. It comprises a novel and effective catalytic hydrogenation process using highly selectively primary amine-forming cobalt catalysts whereby cyanoalkanes are converted into the corresponding diaminoalkanes with a minimum of undesirable side reactions such as the formation of cyclic or polymeric amines. The use of these special cobalt catalysts has many advantages over the use of other hydrogenation catalysts including cobalt catalysts in general in that under otherwise identical conditions less undesirable by-product materials are produced which not only increases the efficiency of the conversion but also makes the refining operations simpler. By the processes of this invention the hydrogenation may be carried out at much higher pressures than by the use of other catalysts without decreasing the yields of primary amines obtained, thus decreasing reaction times. It moreover enables high yields of diaminoalkanes to be obtained even in the absence of ammonia solvent and in all cases the amount of ammonia used may be considerably reduced under that needed with other catalysts.

Since many apparently and widely different embodiments of this invention may be made without departing from the spirit or scope thereof, it is to be understood that the invention is not to be limited to the specific embodiments thereof, except as defined in the following appended claims.

I claim:

1. The process for the preparation of a di-primary diamino alkane which comprises catalytically hydrogenating a dicyanoalkane having from 3 to 20 carbon atoms in the presence of a highly selectively primary amine-forming cobalt hydrogenation catalyst at a temperature between 50 and 170° C.

2. The process in accordance with claim 1 characterized in that the reaction is carried out in the liquid phase.

3. The process in accordance with claim 1 characterized in that the reaction is carried out in the presence of ammonia.

4. The process in accordance with claim 1 characterized in that the reaction is carried out between 75 and 140° C.

5. The process in accordance with claim 1 characterized in that the reaction is carried out at a pressure between 1,000 and 10,000 lbs./sq. in.

6. The process in accordance with claim 1 characterized in that the reaction is carried out at a temperature between 75 and 140° C. and at a pressure between 1,000 and 10,000 lbs./sq. in.

7. The process for the production of 1,6-diaminohexane which comprises catalytically hydrogenating 1,4-dicyanobutane in the presence of a highly selectively primary amine-forming cobalt hydrogenation catalyst at a temperature between 75 and 140° C. and under a pressure between 1,000 and 10,000 lbs./sq. in. said reaction being further characterized in that it is carried out in the liquid phase and in the presence of ammonia.

8. The process for the preparation of 1,6-diaminohexane which comprises catalytically hydrogenating 1,4-dicyanobutane in the presence of a highly selectively primary amine-forming cobalt hydrogenation catalyst at a temperature between 75° and 140° C. and at a pressure between 1,000 and 10,000 lbs./sq. in.

9. A process for the preparation of a di-primary diaminoalkane which comprises catalytically hydrogenating a dicyanoalkane having from 3 to 20 carbon atoms in the presence of a pyrophoric cobalt catalyst at a temperature between 50° and 170° C.

10. The process in accordance with claim 9 characterized in that the pyrophoric cobalt catalyst is prepared by reacting a cobalt salt with a solution of sodium-naphthalene, and then separating the precipitated cobalt from the reaction mixture.

11. The process in accordance with claim 9 characterized in that the cobalt catalyst is prepared by treating a cobalt-aluminum alloy with a solution of sodium hydroxide.

12. The process in accordance with claim 9 characterized in that the cobalt catalyst is prepared by reducing an oxygen-containing cobalt compound at a temperature within the range of 400° to 700° C. with hydrogen.

13. The process for the preparation of a di-primary diaminoalkane which comprises catalytically hydrogenating a dicyanoalkane having from 3 to 20 carbon atoms in the presence of a cobalt catalyst prepared by stabilizing pyrophoric cobalt by exposure to an oxidizing atmosphere at a temperature below 50° C., said hydrogenation reaction being carried out at a temperature between 50° and 170° C.

14. The process in accordance with claim 13 characterized in that the catalyst is prepared by the reduction of a cobalt compound with a solution of sodium-naphthalene, separating the precipitated cobalt, and thereafter stabilizing same by exposing the precipitated cobalt to an oxidizing atmosphere at a temperature below 50° C.

15. The process in accordance with claim 9 characterized in that the cobalt catalyst is prepared by stabilizing the cobalt obtained by treating cobalt-aluminum alloy with a solution of sodium hydroxide by exposure to an oxidizing atmosphere at a temperature below 50° C.

16. The process in accordance with claim 9 characterized in that the cobalt catalyst is prepared by reducing an oxygen-containing cobalt compound at a temperature within the range of 400° to 700° C. with hydrogen, and thereafter stabilizing same by exposing said reduced cobalt to an oxidizing atmosphere at a temperature below 50° C.

17. The process for the production of 1,6-diaminohexane which comprises catalytically hydrogenating 1,4-dicyanobutane in the presence of a pyrophoric cobalt catalyst at a temperature between 75° and 140° C. and under a pressure between 1000 and 10,000 pounds per square inch, said reaction being further characterized in that it is carried out in the liquid phase and in the presence of ammonia.

18. The process in accordance with claim 17 characterized in that the pyrophoric cobalt catalyst is prepared by reacting a cobalt salt with a solution of sodium-naphthalene, and then separating the precipitated cobalt from the reaction mixture.

19. The process in accordance with claim 17 characterized in that the cobalt catalyst is prepared by treating a cobalt-aluminum alloy with a solution of sodium hydroxide.

20. The process in accordance with claim 17 characterized in that the cobalt catalyst is prepared by reducing an oxygen-containing cobalt compound at a temperature within the range of 400° to 700° C. with hydrogen.

21. The process for the production of 1,6-diaminohexane which comprises catalytically hydrogenating 1,4-dicyanobutane at a temperature between 75° and 140° C. and under a pressure between 1000 and 10,000 pounds per square inch in the presence of a cobalt catalyst prepared by stabilizing pyrophoric cobalt by exposure to an oxidizing atmosphere at temperatures below 50° C., said reaction being further characterized in that it is carried out in the liquid phase and in the presence of ammonia.

22. The process in accordance with claim 21 characterized in that the catalyst is prepared by the reduction of a cobalt compound with a solution of sodium-naphthalene, separating the precipitated cobalt, and thereafter stabilizing same by exposing the precipitated cobalt to an oxidizing atmosphere at a temperature below 50° C.

23. The process in accordance with claim 21 characterized in that the cobalt catalyst is prepared by stabilizing the cobalt obtained by treating cobalt-aluminum alloy with a solution of sodium hydroxide by exposure to an oxidizing atmosphere at a temperature below 50° C.

24. The process in accordance with claim 21 characterized in that the cobalt catalyst is prepared by reducing an oxygen-containing cobalt compound at a temperature within the range of 400° to 700° C. with hydrogen, and thereafter stabilizing same by exposing said reduced cobalt to an oxidizing atmosphere at a temperature below 50° C.

FRANK K. SIGNAIGO.

CERTIFICATE OF CORRECTION.

Patent No. 2,166,183.  July 18, 1939.

FRANK K. SIGNAIGO.

It is hereby certified that error appears in the printed specification of the above numbered patent requiring correction as follows: Page 4, second column, line 40, in the formula, strike out "(tertiary amine)" and insert the same in line 36, under the last compound in formula (4); page 5, second column, lines 35 and 41, claims 15 and 16 respectively, for the claim reference numeral "9" read 13; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.

ture between 75° and 140° C. and under a pressure between 1000 and 10,000 pounds per square inch in the presence of a cobalt catalyst prepared by stabilizing pyrophoric cobalt by exposure to an oxidizing atmosphere at temperatures below 50° C., said reaction being further characterized in that it is carried out in the liquid phase and in the presence of ammonia.

22. The process in accordance with claim 21 characterized in that the catalyst is prepared by the reduction of a cobalt compound with a solution of sodium-naphthalene, separating the precipitated cobalt, and thereafter stabilizing same by exposing the precipitated cobalt to an oxidizing atmosphere at a temperature below 50° C.

23. The process in accordance with claim 21 characterized in that the cobalt catalyst is prepared by stabilizing the cobalt obtained by treating cobalt-aluminum alloy with a solution of sodium hydroxide by exposure to an oxidizing atmosphere at a temperature below 50° C.

24. The process in accordance with claim 21 characterized in that the cobalt catalyst is prepared by reducing an oxygen-containing cobalt compound at a temperature within the range of 400° to 700° C. with hydrogen, and thereafter stabilizing same by exposing said reduced cobalt to an oxidizing atmosphere at a temperature below 50° C.

FRANK K. SIGNAIGO.

CERTIFICATE OF CORRECTION.

Patent No. 2,166,183. July 18, 1939.

FRANK K. SIGNAIGO.

It is hereby certified that error appears in the printed specification of the above numbered patent requiring correction as follows: Page 4, second column, line 40, in the formula, strike out "(tertiary amine)" and insert the same in line 36, under the last compound in formula (4); page 5, second column, lines 35 and 41, claims 15 and 16 respectively, for the claim reference numeral "9" read 13; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.